United States Patent [19]

Ganoung

[11] 4,023,641

[45] May 17, 1977

[54] POWERTRAIN AND METHOD FOR ACHIEVING LOW EXHAUST EMISSION AND HIGH FUEL ECONOMY OPERATION OF A COMBUSTION ENGINE

[76] Inventor: David P. Ganoung, 4406 Chickasaw Road, Memphis, Tenn. 38117

[22] Filed: Sept. 25, 1975

[21] Appl. No.: 616,640

[52] U.S. Cl. .............................. 180/66 R; 60/449; 180/65 C
[51] Int. Cl.² ........................................ B60K 17/10
[58] Field of Search .......... 180/66 R, 65 C; 60/433, 60/449, 445

[56] References Cited

UNITED STATES PATENTS

| | | | |
|---|---|---|---|
| 2,500,580 | 3/1950 | Segsworth | 60/449 |
| 2,516,662 | 7/1950 | Vickers et al. | 60/433 |
| 2,547,578 | 4/1951 | Holmes | 180/66 R |
| 3,058,297 | 10/1962 | Tolley | 180/66 R |
| 3,153,900 | 10/1964 | Pigeroulet et al. | 180/66 R |
| 3,369,360 | 2/1968 | De Biasi | 180/66 R |
| 3,421,319 | 1/1969 | Patin | 60/433 |
| 3,451,217 | 6/1969 | Quinn | 60/433 |
| 3,565,202 | 2/1971 | Evans | 180/65 C |
| 3,659,672 | 5/1972 | Jacobus | 180/65 C |
| 3,792,327 | 2/1974 | Waldorf | 180/65 C |

FOREIGN PATENTS OR APPLICATIONS 665,093  6/1963  Canada .......................... 180/66 R Primary Examiner—Joseph F. Peters, Jr.
Assistant Examiner—David M. Mitchell
Attorney, Agent, or Firm—Richard A. Bachand

[57] ABSTRACT

A vehicular powertrain includes a conventional gasoline internal combustion engine, a continuously variable ratio transmission, and a feedback control system and engine speed sensor for regulating the power produced by the engine to a value selected by the vehicle operator. The feedback control system operates the engine at wide open throttle and a lean burn air-fuel ratio over a wide range of operating conditions of the vehicle, with the control system adjusting the transmission ratio to regulate the engine speed to a value corresponding to the power selected by the operator. As a result of the extensive engine operation at wide open throttle and a lean burn air-fuel ratio, exhaust emissions are held to a low level while fuel economy is significantly increased.

15 Claims, 2 Drawing Figures

POWERTRAIN AND METHOD FOR ACHIEVING LOW EXHAUST EMISSION AND HIGH FUEL ECONOMY OPERATION OF A COMBUSTION ENGINE

BACKGROUND OF THE INVENTION

1. Field of the Invention

This invention relates to vehicular powertrains, and more particularly to improvements in vehicular powertrains which facilitate low engine rpm which high torque output capability, and with respect to internal combustion engines, provides high fuel economy and low emissions of exhaust gas pollutants.

2. Description of the Prior Art

In recent years, the need for controlling certain components of the exhaust gases emitted from internal combustion engines, especially automotive engines, has been recognized. Unfortunately, the methods used for reduction of exhaust emissions, most notably nitrogen oxides, also often cause a significant reduction in fuel economy.

Since the formation of nitrogen oxides depends strongly on combustion temperature, changes that reduce this temperature have been used effectively as a control. These changes usually include adjustments such as reduced compression ratios and relatively retarded spark timing. In contrast to the adjustments just mentioned, the combustion of moderately lean air-fuel mixtures can improve fuel economy while also lowering combustion temperature and consequently nitrogen oxides emissions. Although these benefits of lean mixture strength are well-known, the accompanying problems of the difficulty of spark ignition of lean mixtures and the greatly increased sensitivity to variations in mixture strength are also well-known.

The stratified charge engine embodies the most advanced method of emissions control yet to be used in high volume automotive production. The stratification of the air-fuel mixture, in contrast to the relatively homogeneous mixture used in more conventional engines, provides a solution to the problem of spark ignition of mixtures having a relatively lean overall air-fuel ratio. This solution is simply to locate the spark plug in an area of the combustion chamber occupied by a relatively rich, easily ignitable portion of the air-fuel mixture. Additionally, refined carburetion and intake manifolding have solved the driveability problem by reducing cycle-to-cycle and cylinder-to-cylinder variations in air-fuel ratio. As a result, low exhaust emissions have been achieved with efficiency and driveability comparable to that of the conventional automotive engines used before the adoption of emissions control equipment.

Another approach which controls the legally defined exhaust gas pollutants with no significant fuel economy penalty is treatment of the exhaust gases with a catalytic converter. However, in spite of widespread usage on automobiles now being produced, the continued use of the catalytic converter is questionable because of greatly increased toxic emissions of sulfuric acid.

Beyond the recent advances which eliminate the fuel economy penalty associated with strict control of exhaust emissions, methods of significant fuel economy increases, still in conjunction with tightly controlled emissions, are presently needed. The Stirling cycle engine promises this, but more development work is needed and cost may remain a major obstacle. Although the stratified charge engine is another possibility, a significant change is required in comparison to the stratified charge engine previously mentioned. The previously mentioned engine uses throttling of its combustion intake air to control engine torque to the desired value, but it is the pumping loss associated with this throttling that must be eliminated to realize a fuel economy advantage. Since spark ignition of utra-lean air-fuel mixtures is possible in a stratified charge engine, torque can be controlled by varying the air-fuel ratio, ultra-lean mixtures producing limited torque values largely without the necessity for throttling. In other words, engine torque can be limited by restricting only fuel flow, rather than by restricting both fuel and air flow as in a throttled engine. However, the required apparatus for appropriately varying air-fuel ratio is expensive and, more importantly, the extremely low combustion temperatures occurring at ultra-lean mixture strengths are insufficient for thorough oxidation of gaseous exhaust emission of hydrocarbons.

In conclusion, the prior art includes no practical way of controlling exhaust pollutants to a low level while simultaneously increasing fuel economy a substantial amount in comparison to the automotive engines and powertrains used previous to the adoption of emissions control equipment.

SUMMARY OF THE INVENTION

In light of the above, it is, therefore, a principal object of the invention to present a vehicular powertrain which emits only low levels of the legally defined combustion exhaust gas pollutants, but which also provides significantly improved fuel economy, even in comparison to the automotive powertrains used before exhaust emission requirements.

This, and other objects, features, and advantages, will become apparent to those skilled in the art from the following detailed description when read in conjunction with the appended claims and the accompanying drawing.

In accordance with the invention in its broad aspect, a vehicular powertrain having a continuously variable ratio transmission is presented. The powertrain also includes a conventional internal combustion engine, a feedback control system, a device for operator control, and a device for sensing the speed of the engine. Over most of the speed range of the engine, the control system allows only wide open throttle operation, and the engine carburetor or fuel injection system is calibrated for lean burn combustion throughout the wide open throttle range. The amount of power produced by the engine is regulated to a value corresponding to the level of the input signal from the operator control device because the control system adjuts the transmission ratio to load or unload the engine and thereby appropriately regulate engine speed, as indicated by the input signal from the speed sensing device.

BRIEF DESCRIPTION OF THE DRAWING

The invention is illustrated in the accompanying drawing, in which.

In the figures of the drawing, like reference numerals are used to denote like parts.

DESCRIPTION OF THE PREFERRED EMBODIMENT

Figure 1:
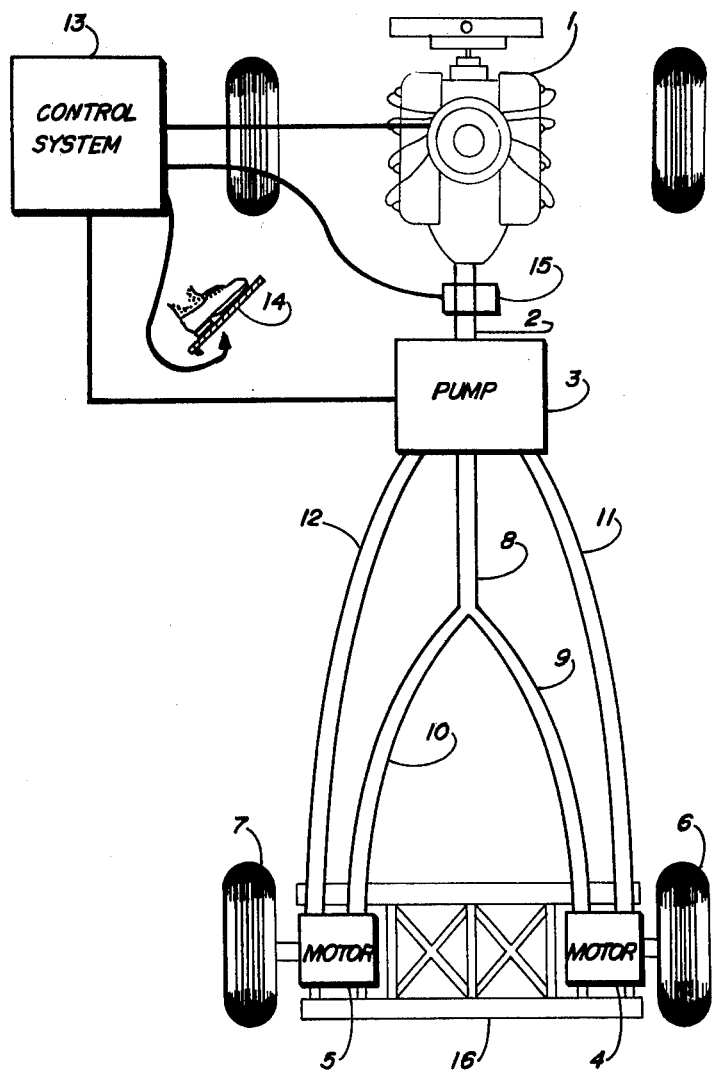
FIG. 1 is a diagram of a powertrain in accordance with a preferred embodiment of the invention, used in conjunction with an automobile.

FIG. 1 shows a preferred embodiment of a powertrain used in conjunction with an automobile in accordance with the present invention. In the figure, the crankshaft of a conventional automotive piston engine 1 directly drives the input shaft 2 of a continuously variable displacement hydraulic pump 3, which in turn has its fluid output connected to drive two identical reversible hydraulic motors 4 and 5.

It should be appreciated that any type of continuously variable transmission can be equally advantageously employed as the hydraulic pump and motors. For example, an electric generator having a power input shaft coupled to the output shaft of the engine, and at least one electric motor connected to be driven by the electrical power output of the generator. These elements comprise the major components of a powertrain for self-propulsion of an automobile or similar vehicle. The engine 1 can be viewed as operating to convert heat energy to mechanical energy. The remaining major components of the powertrain transfer the mechanical energy from the engine to the drive wheels 6 and 7, which are turned independently by the fluid driven motors 4 and 5.

The structural member 16 supports the drive motors 4 and 5, and together with the motors and drive wheels, comprises a solid driving axle. Of course, an arrangement for independent suspension of the two drive wheels, rather than the solid axle shown, is easily possible, as is an arrangement for multiple drive axles, or simply a single drive motor and single drive wheel as might be used on a motorcycle. The fluid power output of the pump 3 delivers equal pressure to the motors 4 and 5 through the Y-connection of high pressure fluid conduits 8, 9, and 10; low pressure conduits 11 and 12 recycle hydraulic fluid to the pump 3. Thus, equal fluid driving pressure to the identical motors 4 and 5 independently driving identical traction wheels 6 and 7 assures the differential action for vehicle turning (normally achieved using a special system of differential gears). Finally, in FIG. 1 a control system 13 has inputs controllable by the vehicle operator through a pedal 14 and from a device 15 which senses the crankshaft speed of the engine 1. The control system 13 additionally has outputs to control the displacement of the pump 3 and to control the throttle position of the carburetor or fuel injection system of the engine 1.

In operation, the conventional engine 1 employs valve timing enabling a wide range of power output with the engine carburetor or fuel injection throttle wide open. As an example, a typical 350 cubic inch displacement automobile engine running slightly above idle speed will produce only on the order of 10 brake horsepower under the conditions of W.O.T. (wide open throttle) and a moderately leaner than stoichiometric air-fuel ratio of about 22 to 1 (by weight). At the same air-fuel ratio and W.O.T., but as nearly maximum crankshaft speed, the same engine will normally produce about 100 horsepower. Any power output between 10 and 100 horsepower can therefore also be produced at W.O.T. and a 22 to 1 air-fuel ratio, provided that the engine is constrained to operate at the appropriate crankshaft speed. Since the combination of the variable displacement pump 3 and the fixed displacement motors 4 and 5 comprises a continuously variable ratio transmission, the control system 13 can usually provide this constraint by appropriately selecting the displacement of the pump 3 whereby a decrease or increase in pump displacement will respectively increase or decrease the engine speed. The pump 3 of the embodiment employed should have a sufficiently wide range of displacements, on the order of about 6 to 1 or even significantly greater, to allow W.O.T. operation over a great variety of vehicle operating conditions. The control system 13 is arranged, as explained later in detail, to operate the engine 1 both at W.O.T. and at a moderately leaner than stoichiometric air-fuel ratio whenever practical. (W.O.T. operation at less than idle speed illustrates a normally impractical engine operating condition.)

As an example of the powertrain operation described above, the vehicle operator pushes the pedal 14, as in a conventional automobile, roughly in proportion to how much power he wants to be produced at the drive axle. For the present invention, this power will be approximately proportional to the engine crankshaft speed, as sensed by the device 15, because at the W.O.T. and relatively constant air-fuel ratio conditions imposed by the control system, the engine torque will remain fairly constant and independent of crankshaft speed. Therefore if the pedal were held at a constant position corresponding to, say, 20 horsepower, the control system would limit the engine crankshaft speed to the value corresponding to 20 horsepower by adjusting the displacement of the pump. As a further illustration, the operator might decide to depress the pedal more to climb a steep hill while maintaining a constant vehicle speed. If the pedal position were detected by the control system to correspond to the much higher engine speed at which, say, 50 horsepower is produced, the sensing device would immediately cause an error signal in the control system, which would respond by decreasing the pump displacement to allow the engine to speed up and produce more than the original 20 horsepower. When the error signal between selected power production and actual power production reaches zero, the control system ceases adjustment of the pump displacement. (In reality, the error signal is between selected engine speed and actual engine speed.) Thus the control system 13 receives feedback from the speed sensing device 15. Similarly, the vehicle operator functions as a "feedback" control system with his output controlling the control system 13. For instance, 50 horsepower might be more power than required to climb the hill of the previous example at a constant vehicle speed. The operator would then, after noticing the resulting acceleration of the vehicle, compensate by making small, gradual trial-and-error and adjustments in the pedal position, in a manner similar to that of a conventional automobile.

In summary, the control system 13 establishes a correspondence between most of the travel of the pedal 14 and a wide range of engine power production occurring at W.O.T. and an air-fuel ratio of about 22 to 1. Each pedal position within the W.O.T. and 22 to 1 air-fuel ratio range actually corresponds to a certain engine speed, and the displacement of the pump 3 is adjusted to maintain that engine speed regardless of vehicle speed. The control system also provides throttling and/or enrichment of air-fuel ratio when W.O.T. and moderately lean operation is not possible or practical. For example, exceptionally small amounts of power production are programmed at the very initial positions of the pedal and require throttling and usually some air-fuel ratio enrichment. Another example is that fairly small power outputs possible at W.O.T. and a 22 to 1 air-fuel ratio cannot occur at exceptionally high vehicle speeds because of the limit imposed by the range of displacement of the pump. (This particular situation does not necessarily require throttling.). Finally, at the extreme depressed position of the pedal, air-fuel ratio enrichment, even beyond stoichiometric, can be utilized for maximum vehicle performance.

Figure 2:
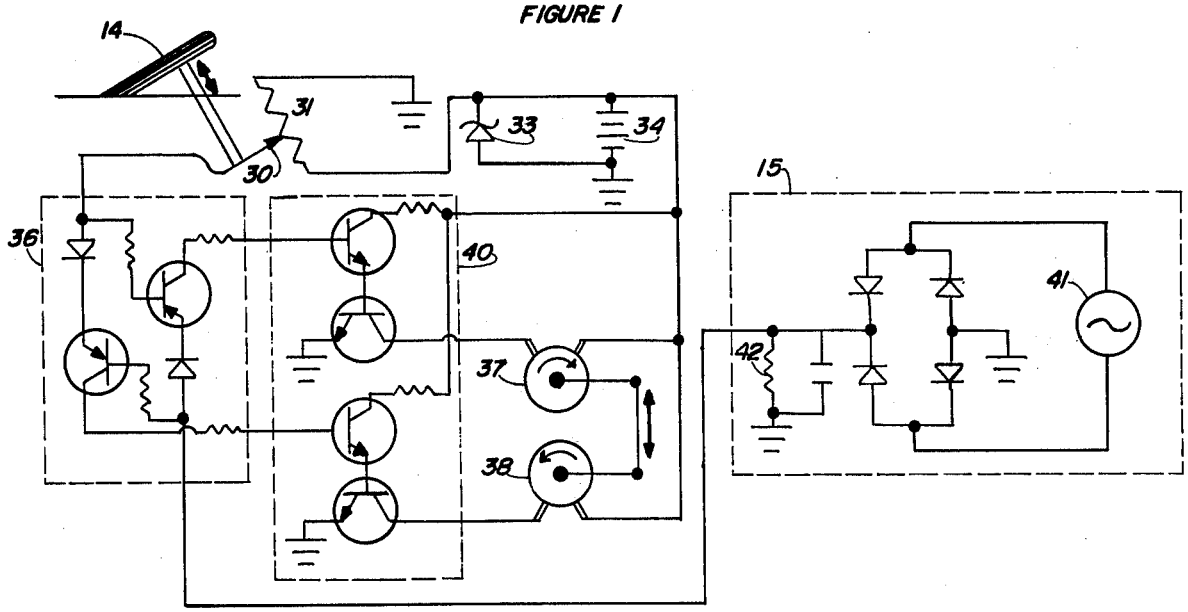
FIG. 2 is an electrical and mechanical schematic diagram of the control feedback circuit employed in the powertrain of FIG. 1.

The following is an example, as illustrated in FIG. 2, of one of the many ways in which the control system 13 can be easily and inexpensively constructed. Over a large portion of its range of movement, the operator pedal 14 moves a carbon brush 30 slideably in electrical contact with a wire wound resistor 31, which in turn has a direct current voltage, regulated by a zener diode 33, impressed across it from the vehicle storage battery 34 or from a circuit which elevates the battery voltage (now shown). The resulting variable voltage at the carbon brush 30 is compared, through a bridge circuit, generally indicated by the reference numberal 36, to the crankshaft speed dependent voltage input from the engine speed sensor, generally indicated by the reference numeral 15. The bridge circuit and an associated amplifier 40 drive motors 37 and 38 connected to adjust the displacement of the pump 3 (in FIG. 1) until the voltages compared by the bridge 36 are equal. The speed sensing device 15 can alternatively (and conveniently) include a small alternating current generator 41 similar to those commonly used as a trigger source for electronic ignition systems, mounted in the ignition distributor and driven by a shaft thereof. Rectifying, filtering, and applying the output of the small A.C. generator across a fixed load resistance 42 provides the speed voltage signal.

Over a small initial portion of the movement of the operator pedal 14, the carbon brush 30 remains in a fixed initial position to provide a voltage corresponding to the lowest engine speed at which W.O.T. and moderately lean operation is desirable, usually a speed just above that at idle. Also, through this small initial range of pedal movement, the throttle valve (not shown) of the engine carburetor or fuel injection system is progressively opened from idle position to a wide open position, either by direct mechanical linkage to the pedal or preferably by a servo motor. The carburetor or fuel injection system is calibrated to provide about a 22 to 1 air-fuel ratio throughout W.O.T. operation, and usually to provide slightly richer air-fuel ratios at part-throttle conditions; thus, the influence which the control system has over air-fuel ratio is actually indirect. Since the throttle remains wide open as the carbon brush is advanced from its initial position to a final position corresponding to maximum engine operating speed, the control system in effect establishes a correspondence between each moderately lean, W.O.T. power output and a unique position of the operator pedal. If desired, the final increment of pedal movement can cause significant air-fuel ratio enrichment so that maximum torque output accompanies maximum speed operation of the engine. This can conveniently be done, for example, using a switch which is turned on at the last of the pedal movement; the switch would supply current to a solenoid actuating a power enrichment valve much like that used in conventional carburetors.

Again returning to FIG. 1, a valve (not shown) for short circuiting the pump flow around the drive motors would perform the same function as a clutch. Also, appropriate valving to the reversible drive motors can provide the function of a reverse transmission gear. Thus, the pump and two motors replace the differential and transmission (including clutch, if used) of a conventional powertrain.

The most obvious advantages of the powertrain as herein described relate to fuel economy, as illustrated by the following example. The engine in a typical automobile cruising at 55 M.P.H. on a level road is highly throttled to produce a very restricted torque at a moderate engine speed. In contrast, the engine used in the powertrain herein would operate at W.O.T. to produce high torque at a low engine speed. The resulting elimination of air pumping losses across the throttle valve generates a significant increase in fuel economy (a decrease in brake specific fuel consumption). In fact, the elimination of throttling losses is the reason for the substantial fuel economy advantage the unthrottled stratified charge engine has in comparison to conventional engines. Beyond this, the powertrain of the invention has an advantage even in comparison to the unthrottled startified charge engine because the stratified charge engine, like conventional engines, often operates at restricted torque outputs. High torque, slower speed operation minimizes the substantial effect of engine friction because engine friction increases drastically with crankshift speed but is nearly independently of torque. Of course W.O.T. (unthrottled) operation does not imply the absolute and completely removal of all pressure drops in the combustion air intake of the engine. For example, carburetors, especially those employing air valves, cannot metal fuel without creating a slight pressure drop. However the purpose of such pressure drops does not include restriction of engine torque as a means of regulating drive axle torque. Also, throttling of just the combustion air, before the fuel is added, is considered to be throttling of the air-fuel mixture.

Other advantages of the preferred embodiment relate to control of exhaust emissions and are due to the use of a lean burn air-fuel ratio of about 22 to 1. The simultaneous lowering of exhaust emission of hydrocarbons, carbon monoxide, and nitrogen oxides to nearly minimum values by using lean burn air-fuel ratios is well documented. (Of course, for fuels other than gasoline, the most desirable lean burn air-fuel ratio may be significantly different from 22 to 1.) The advantage of the preferred embodiments is that W.O.T. operation does much to eliminate the difficulty of spark ignition of homogeneous mixtures of moderately lean air-fuel ratios because the high compression pressures existing at W.O.T. greatly facilitate successful spark ignition, a fact also well documented for various fuels in addition to gasoline. Actually, the benefit is twofold because the lesser ignition spark advance necessary at W.O.T. for maximum fuel economy causes the spark to be delivered when the piston has further compressed the air-fuel charge. As a result, little or no special equipment is necessary to facilitate successful spark ignition of homogeneous lean burn air-fuel mixtures and little or no special equipment is necessary to augment the emission reductions affected by the lean burn combustion. Nevertheless, good driveability requires reasonable control of variations in air-fuel ratio, and, enlarged and insulated exhaust manifolds minimize hydrocarbon emissions at air-fuel ratios lean enough to minimize nitrogen oxides emissions. Additionally, a 22 to 1 air-fuel ratio is close to the optimum for fuel economy.

All of the advantages just enumerated for the preferred embodiment also exist in many alternative arrangements including: (1) obtaining differential turning action by using a single hydraulic motor driving a conventional geared differential, (2) alternative or additional variable displacement capability for the hydraulic drive motor or motors, (3) using a conventional geared transmission in combination with a continuously variable ratio transmission to greatly extend the range of continuously variable ratios, and (4) using an electric generator-motor arrangement as an alternative continuously variable ratio transmission. In addition, a rotary-type engine or a stratified charge engine could be used in place of the conventional piston engine of the preferred embodiment.

In more broad terms, the following discussion reveals the distinction between the present invention and all previous powertrains using internal combustion engines. In accordance with the invention, torque at the vehicle drive wheels must be continuously variable to meet changing road conditions such as hills. In previous powertrains, however, important variables which effect engine torque, such as the throttle, or such as air-fuel ratio in the case of the unthrottled stratified charge engine, are regulated in providing the continuous control of drive axle torque. However, these same variables often greatly influence brake specific fuel consumption or exhaust emissions. Again with the stratified charge engine as an example, ultra-lean air-fuel ratios do restrict engine torque, and thus drive axle torque, but they also engender the most serious shortcoming of the stratified charge engine — hydrocarbon emissions due to a very low combustion temperature. As another example, even those powertrains utilizing continuously variable ratio transmissions restrict engine torque as at least a part of the regulation of drive axle torque. The powertrain advanced by Segsworth in U.S. Pat. No. 2,500,580 illustrates this because substantial engine throttling is therein provided at all but maximum speed. In contradistinction, the present invention employs a continuously variable ratio transmission as the only means for varying torque at the vehicle drive axle, with the result that important variables affecting combustion and thus engine torque, are free to be selected with regard only to fuel economy and/or exhaust emissions.

In even broader terms, there are only two basic parameters, not including inertia effects, which determine the drive axle torque of any powertrain which includes a cyclic heat driven engine. Since torque is a measure of the energy delivered per shaft revolution, these two parameters are: (1) The number of heat expansion cycles delivering energy to each revolution of the drive axle (if the vehicle is turning and differential action is present, an eqivalent revolution of the drive axle can conveniently be defined to occur when the revolution of one drive wheel of the drive axle plus the revolution of the other drive wheel equals exactly two whole revolutions) and (2) the amount of energy delivered to the drive axle per heat expansion cycle. Obviously, drive axle torque can be considered to be the product of the above two parameters. The present invention includes the method of varying drive axle torque by continuously varying the first parameter above, with the second parameter being selected with regard only to powertrain performance aspects other than regulation of drive axle torque. All previous methods vary the second parameter as at least a part of the method for providing continuous control of drive axle torque. (The first parameter may also be varied for torque control, but usually only incrementally.) Obviously, this method of the present invention can also be applied to external combustion engines, such as a steam driven piston engine, but with less benefit because removal of the combustion process from the space in which the cyclic heat expansions occur can itself allow more freedom in selection of variables affecting combustion. Even so, benefits such as minimizing the effects of engine friction by low speed, high torque operation can be realized. In addition, this method of the present invention does not absolutely require a continuously variable ratio transmission as such. For example, double-ended pistons driven by a heated expanding gas can directly pump hydraulic fluid, with the hydraulic fluid driving a variable displacement hydraulic motor. The hydraulic fluid can apply force to the pistons during the compression phase of the heat conversion cycles, thus eliminating any need for mechanisms such as connecting rods and crankshafts. In this last example, there is no distinct delineation between engine and transmission; the entire apparatus described would comprise a powertrain because it includes apparatus for conversion of heat to mechanical energy and for transfer of the mechanical energy to drive axle of a vehicle or other machine. (If vehicular differential turning action were desired, the variable displacement hydraulic motor could drive a geared differential, which would then also be considered a part of the powertrain.)

Unthrottled operation and lean burn combustion, both over a wide range of engine conditions, are the primary features of the present invention because all the advantages explained derive directly from these features. The continuously variable transmission or similar arrangement is a secondary feature in that it is required for implementation of the primary features.

As a final consideration, the method included in the present invention can also be applied to powertrains wherein the heat expansin process for converting heat energy into mechanical energy occurs continuously rather than in cycles, for example in powertrains which include turbine engines. In this case, the average drive axle torque is a function of two parameters: (1) The ratio between the rotational velocity of the drive axle and the average time rate of change of the volume of the heated, expanding working fluid used for the heat to mechanical energy conversion process, and (2) the average pressure applied by the heated, expanding working fluid. The method of the present invention is to continuously vary the first parameter listed above as a means of regulating drive axle torque, thus allowing variables affecting the second parameter to be selected without regard to drive axle torque.

Although the invention has been described and illustrated with a certain degree of particularly, it should be understood that the present disclosure is made by way of example only and that numerous changes in the arrangement and combination of parts may be resorted to without departing from the spirit and scope of the invention as hereinafter claimed.

What is claimed is:

1. A powertrain comprising:
   a combustion heat driven engine having a power output shaft, a continuously variable ratio transmission having a power input shaft coupled to said engine output shaft, control means for controlling the ratio of said transmission, means connected to said control means for supplying an operator input signal corresponding to the desired power output of said engine, and means for generating a signal related to the power output of said engine and for applying said generated signal to said control means;

said control means facilitating unthrottled flow of a lean burn and substantially constant strength air-fuel mixture to said engine for combustion, whereby fuel economy is improved and combustion exhaust gas emissions of carbon monoxide and notrogen oxides are reduced, and said control means adjusting the ratio of said transmission in response to a difference between said operator input signal and said generated signal to establish said desired engine power output by increasing or decreasing the load on the engine to respectively, decrease or increase the engine speed.

2. The powertrain of claim 1 wherein said engine is an internal combustion engine.

3. The powertrain of claim 2 wherein said engine is a homogeneous charge internal combustion engine.

4. The powertrain of claim 3 wherein said engine is a reciprocating piston engine.

5. The powertrain of claim 1 wherein said transmission comprises a continuously variable displacement hydraulic pump having a power input shaft coupled to said engine output shaft and two identical hydraulic motors connected to be driven by a common fluid power output of said hydraulic pump and connected to independently drive two wheels of a drive axle of said powertrain.

6. The powertrain of claim 5 wherein said two hydraulic motors are continuously variable displacement hydraulic motors.

7. The powertrain of claim 5 further comprising a geared transmission interposed between said engine output shaft and said hydraulic pump input shaft.

8. The powertrain of claim 1 wherein said control means comprises an electronic bridge circuit for comparing said generated signal to said operator input signal.

9. The powertrain of claim 1 wherein said control system facilitates said unthrottled flow of air-fuel mixture over substantially the entire crankshaft speed range of said engine.

10. The powertrain of claim 1 wherein said signal generating means comprises a device of sensing the speed of said engine output shaft.

11. The powertrain of claim 10 wherein said speed sensing device is mounted in an ignition distributor of said engine.

12. The powertrain of claim 11 wherein said speed sensing device comprises a small alternating current generator driven by a shaft within said ignition distributor.

13. A method for operating a powertrain comprising:
supplying an unthrottle flow of a lean burn and substantially constant strength air-fuel mixture for combustion to produce heat expansion cycles in the engine, continuously variable controlling, of the number of said cycles which deliver energy to each equivalent revolution of a drive axle of the powertrain, to regulate the brake torque produced at said drive axle to a variable desired value, establishing a wide frequency range of heat expansion cycles by increasing or decreasing the load on the engine to respectively decrease or increase the engine speed, whereby the fuel economy of the powertrain is improved and the exhaust gas emissions of carbon monoxide and nitrogen oxides from said combustion are reduced.

14. A method for operating a combustion engine having a power output shaft coupled to a power input shaft of a continuously variable ratio transmission comprising:

adjusting the ratio of the transmission to regulate the brake torque produced at an output shaft of the transmission to a desired value, and supplying, an unthrottled flow of lean burn and substantially constant strength air-fuel mixture to the engine for combustion, to improve fuel economy and reduce combustion exhaust gas emissions of carbon monoxide and nitrogen oxides, establishing a wide power output range for the engine by increasing or decreasing the transmission ratio to change the load on the engine and respectively, decrease or increase the speed of the engine.

15. A method for operating a vehicle having a combustion engine and drive wheels for propelling the vehicle, comprising:

providing a continuously variable ratio transmission between the engine and the drive wheels, producing a lean burn and substantially constant strength air-fuel mixture in a fuel metering system of the engine, operating said fuel metering system at wide open throttle, producing, a predetermined engine output power by adjusting the ratio of the transmission to increase or decrease the load on the engine to respectively decrease or increase the engine speed, said transmission providing a range of overall gear ratio between the engine and drive wheels to allow said wide open throttle production of said lean burn air-fuel mixture throughout substantially the entire range of operating conditions of the vehicle.

* * * * *